Figure 8:
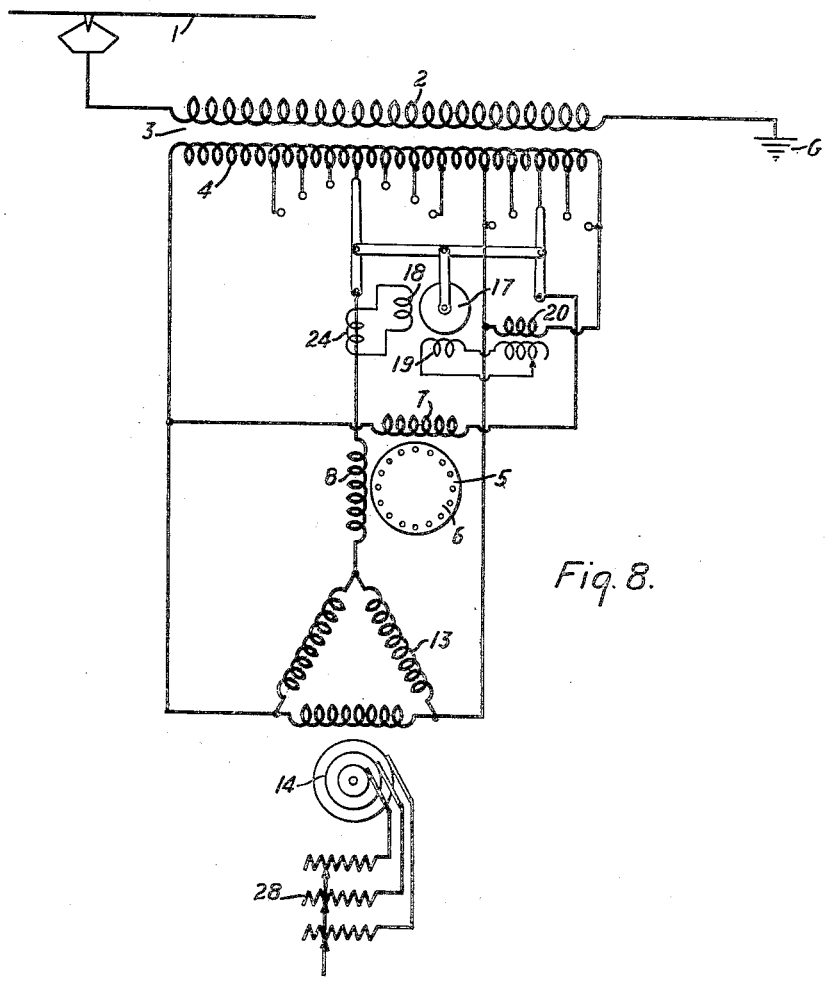

K. A. SIMMON & A. J. HALL.
CONTROL SYSTEM.
APPLICATION FILED JUNE 9, 1914.
1,232,863.
Patented July 10, 1917.
3 SHEETS—SHEET 1.
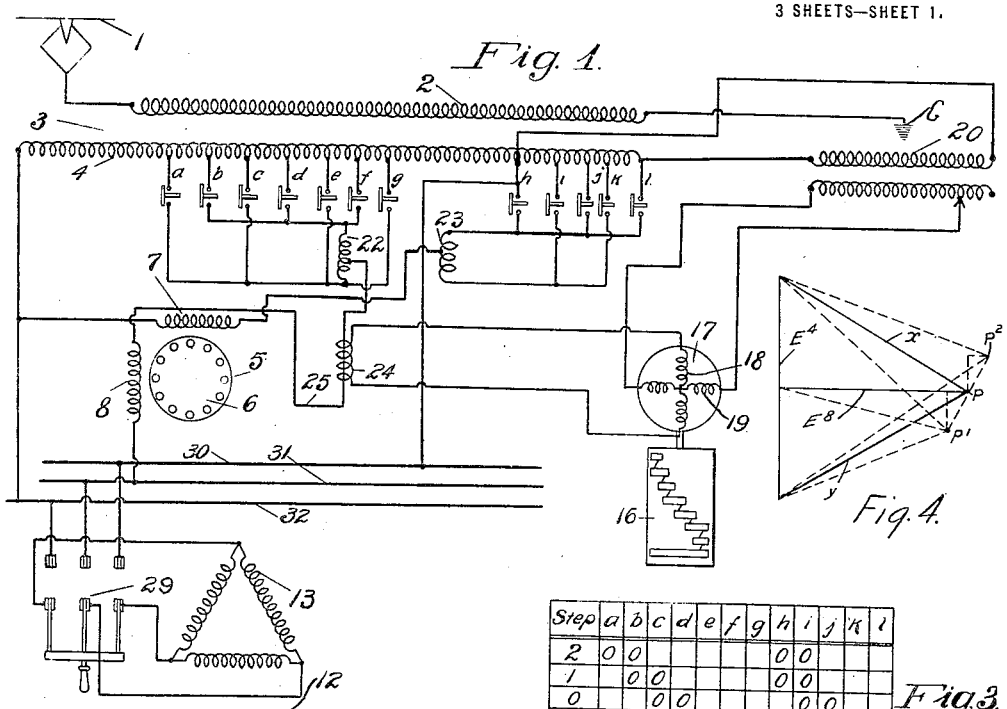
Fig. 1.
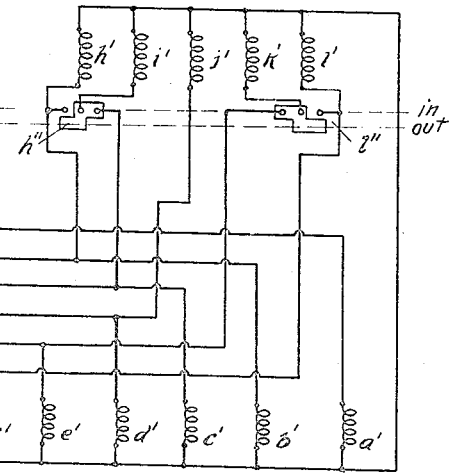
Fig. 4.
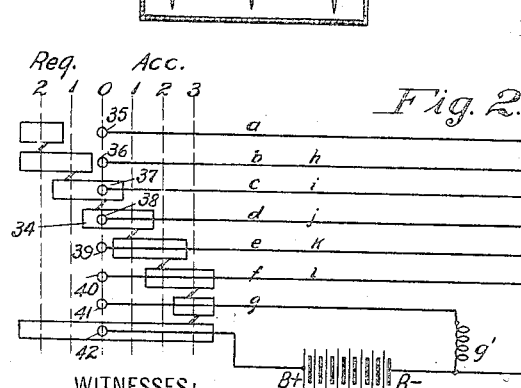
Fig. 3.
Fig. 2.
WITNESSES:
Stephen Wach
D. H. Mace
INVENTORS
Karl A. Simmon
& Arthur J. Hall
BY
Wesley G. Carr
ATTORNEY

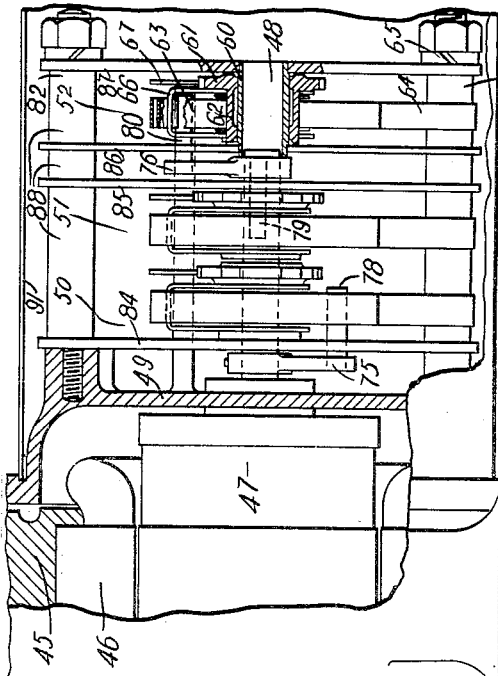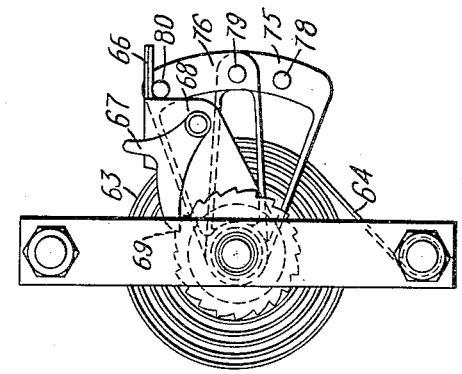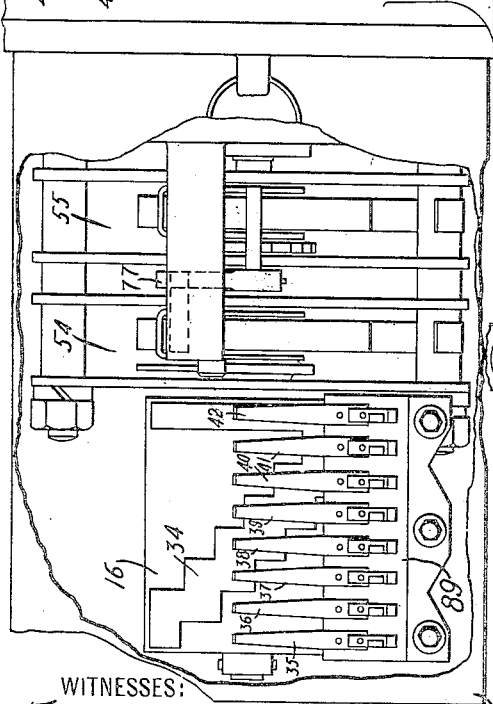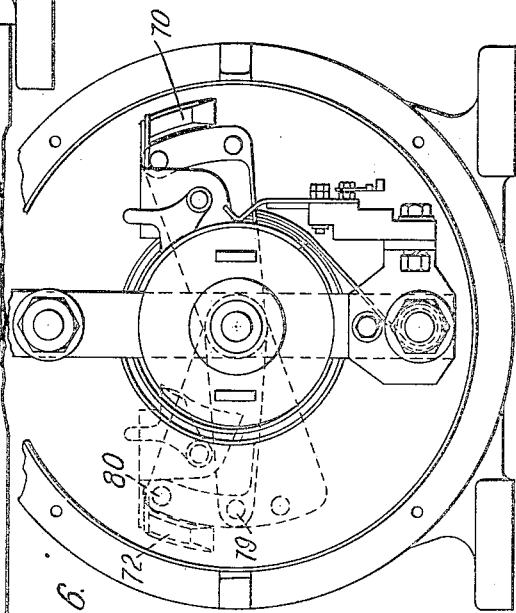

UNITED STATES PATENT OFFICE.

KARL A. SIMMON AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,232,863.  Specification of Letters Patent.  Patented July 10, 1917.

Application filed June 9, 1914. Serial No. 843,929.

*To all whom it may concern:*

Be it known that we, KARL A. SIMMON, a citizen of the United States, and a resident of Wilkinsburg, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Control Systems, of which the following is a specification.

Our invention relates to control systems for dynamo-electric machines, with special reference to alternating-current systems which embody single-phase sources of energy and polyphase dynamo-electric machines that are adapted to operate either as motors or as generators, and are connected to the sources of energy through the agency of so-called phase-converters which serve to convert single-phase energy into polyphase energy during motor operation and polyphase energy into single-phase energy during regenerative periods.

One of the objects of our invention is to provide a system of the above-indicated class which shall be simple in arrangement and reliable and effective in operation and which shall be adapted to automatically compensate for the inherent phase distortion and reduction of voltage of the phase converter under conditions of load, irrespective of whether it be a motor load or a generator load.

Another object of our invention is to provide a control system for a dynamo-electric machine which is connected to a single-phase source of energy through the medium of a phase converter, the excitation and phase distortion of which may be regulated by shifting the connections of the converter with respect to the source of energy and, moreover, to provide an auxiliary means for automatically and concurrently varying the excitation and the phase position of the converter by effecting adjustments of the converter connections to the source of energy.

In a copending application, Serial No. 808,714, filed December 26, 1913, by Benjamin G. Lamme and assigned to the Westinghouse Electric & Mfg. Company, a system of the general type referred to is disclosed, and manually operated switches are provided for adjusting the phase converter connections to the source of energy for the purpose of making corrections for the reduction in excitation and the displacement in phase position of the converter, under load conditions. In this system, balanced load conditions could only be maintained through the manipulation of the switching device by an operator, who must necessarily give his attention to some indicating means in order to make the proper adjustments for securing the desired end.

It is the purpose of our present invention to relieve the operator of this duty, and to provide means for accomplishing it automatically in such manner that the desired conditions shall be maintained at all times, irrespective of the nature of the load.

Our invention may best be understood by reference to the accompanying drawings, in which Figure 1 is a diagrammatic view of the main circuits of a system of control embodying our invention; Fig. 2 is a diagrammatic view of the auxiliary control circuits of our system, the control circuits being segregated from the main circuits for the sake of simplicity in the diagrams and clearness in understanding the system and its operation; Fig. 3 is a chart showing the sequence of switches in the various positions of the control device; Fig. 4 is a vector diagram showing the relationship of certain of the voltages; Figs. 5 and 6 are, respectively, a view, partially in section and partially in side elevation, and a view, in end elevation, of a torque device and controller shown in Fig. 1, and Fig. 7 is a detail view of a portion of said device; and Fig. 8 is a simplified view corresponding to Fig. 1.

Referring to the drawings, the system shown comprises a source 1 and G of single-phase alternating current energy which is connected to a primary winding 2 of a transformer 3 having a secondary winding 4; a phase converter 5 having a squirrel-cage rotor 6, an exciting winding 7 and a secondary winding 8; a plurality of electrically operated transformer switches $a$ to $l$, inclusive, which are divided into two groups, one of which includes switches $a$ to $g$, and is adapted to adjust the connections of one terminal of the converter secondary winding 8 with respect to substantially the middle portion of the transformer secondary winding 4 for the purpose of effecting compensations for the phase distortion which is inherent in the converter 5, under load conditions, and the second group of switches $h$ to $l$, inclusive, being adapted to vary the connections of the exciting winding 7 with respect to the end turns of the transformer winding 4 for the purpose of adjusting the excitation of the converter 5; a polyphase dynamo-electric machine 12 of the induction type having primary windings 13 and secondary windings 14 and which is adapted to act either as a motor receiving energy from the converter 5 or as a generator delivering energy to the source 1 and G through the converter 5; a controller 16 for governing the circuit connections of the electrically operated transformer switches $a$ to $l$, inclusive; a torque device 17 adapted to rotate the controller 16 in either direction, and embodying a plurality of primary windings 18 and 19, the winding 19 having a constant excitation from an auxiliary transformer 20 which is connected across a portion of the transformer winding 4, while the winding 17 is energized in accordance with the current traversing the converter secondary winding 8, whereby the torque developed by the device 17 is responsive to the converter load. The circuit connections are shown in a simplified manner in Fig. 8.

The specific details of the converter 5, dynamo-electric machine 12 and the torque device 17 form no part of our present invention, these devices being illustrative of any suitable means for accomplishing their respective functions. The electrically operated transformer switches $a$ to $l$, inclusive, are preferably of the unit-switch type of any well known construction, and embody energizing coils $a'$ to $l'$ which, of course, are mechanically associated with the respective switches, although they are shown separated therefrom in Fig. 2, for the sake of clearness. The switches $h$ and $l$ are, moreover, provided with auxiliary contact members or interlock switches $h''$ and $l''$ which are shown directly beneath the respective energizing coils $h'$ and $l'$, in Fig. 2 and operated whenever their corresponding switches are opened or closed, in accordance with well-known practice.

A plurality of preventive coils 22 and 23 are provided in the connections between the converter windings 7 and 8 and the transformer winding 4 to prevent a local short circuit upon any portion of the transformer in the customary way, and a series transformer 24 is associated with a conductor 25 which connects one end of the converter secondary winding 8 to the preventive coil 22, said transformer 24 being included in the circuit with the winding 18 of the torque device 17, whereby the operation of said device is rendered electro-responsive to the current traversing the converter secondary winding 8.

The dynamo-electric machine 12 has its secondary windings 14 connected to an adjustable-resistance device 28 which is illustrated as a liquid rheostat, while a suitable switching device 29 serves to connect the primary windings 13 of said machine 12 to bus bars or polyphase supply connectors 30, 31 and 32.

The controller 16 is preferably of the drum type and embodies a rotatable conducting segment 34 and a plurality of coöperating stationary contact terminals 35 to 42, inclusive, which are adapted to engage the conducting segment 34 upon the position-indicating lines marked "O", "Reg 1, 2" and "Acc. 1, 2, 3", dependent upon whether the dynamo-electric machine 12 is regenerating energy to the source or is being accelerated as a motor.

Referring particularly to Figs. 5, 6 and 7, the torque device 17 may be of any suitable construction for performing the functions necessitated by our invention, and may conveniently comprise a torque motor or dynamo electric machine 45 having a stator 46 and a rotor 47 which is adapted for slow rotative movement to a limited degree in one direction, under certain conditions of load, and in the opposite direction under other load conditions. The rotor 47 is provided with a shaft 48 which projects outwardly from both ends of the rotor 47 and carries, at one end, the rotatable control drum 16 which coöperates with its contact terminals or fingers 35 to 42, which are suitably mounted in position. The rotor shaft 48 is mounted for rotative movement in end brackets 49 which are attached to the respective ends of the stator 46. One end of the rotor shaft 48 is provided with a plurality of torque opposing mechanisms 50, 51 and 52, which are adapted to coöperate with the shaft for the purpose of imposing restraint upon its operation when it is rotated in one direction in response to load caused by motor operation of the dynamo-electric machine 12. The other end of the shaft 48 is provided with similar torque-opposing mechanisms 54 and 55 which act in a similar capacity when the regenerative action of the dynamo-electric machine 12 causes the rotor 47 of the torque device 17 to be rotated in the other direction.

The torque-opposing devices 50 to 55, inclusive, are of like construction, except that the devices 54 and 55 are disposed in the opposite direction to the devices 50, 51 and 52, and each comprises a bearing sleeve 60 which is fitted over the shaft 48, a ratchet 61, having an integral laterally projecting tubular member 62, a spiral spring 63 of flat strip material, one end 64 of which is secured to a part of a supporting and positioning structure 65, to be hereinafter described, and the other end of which is fastened to the ratchet wheel 61, a bifurcated finger 66 which straddles the spiral spring 63 and is pivotally mounted upon the tubular member 62, and a pawl or catch 67 pivotally secured to one of the side portions 68 of the finger 66 and adapted to coöperate with the teeth 69 of the ratchet wheel 61.

Coöperating with the ends of the several fingers 66 and associated with the torque-opposing devices 50, 51 and 52 is an arm 70 which forms an integral part of the end bracket 49 or is mechanically associated therewith, the arm 70 being disposed substantially parallel to the shaft 48 and serving to restrain the fingers 66 against the action of the several springs 63, under normal conditions, when the torque device 17 occupies its neutral position. A similar projecting arm 72 performs a like function for the fingers 66 of the devices 54 and 55 that are associated with the other end of the shaft 48.

The type of spring employed is of particular importance in the operation of the torque device 17, inasmuch as it has a peculiar property of maintaining a substantially uniform tension throughout a relatively large range of rotational movement of the shaft, as will hereinafter be more fully pointed out.

The shaft 48 is provided with a plurality of arms 75, 76 and 77 which are fastened thereto and moved thereby. The arm 75 is disposed adjacent to the torque-opposing device 50 and is provided with a pin 78 which projects into the vertical plane of the finger 66 of the device 50, while the arm 76 is interposed between the devices 51 and 52 and is provided with a plurality of pins 79 and 80 which respectively project in opposite directions into the vertical planes of the devices 51 and 52. The pins 78, 79 and 80 are also angularly displaced and, therefore, are adapted to be brought successively into engagement with the lower surfaces of the outer ends of the fingers 66 when the shaft 48 is rotated in a counterclockwise direction, as viewed from the right-hand end of the device.

For the purpose of separating the movable arms 75 and 76 from the adjacent devices 50, 51 and 52, and also for positioning said devices, the supporting structure 65 is employed, which is attached to the end bracket 49. The supporting structure 65 embodies a plurality of rods or bolts 82 and 83 which conveniently may be threaded into the bracket 49 and are located in the vertical plane of the shaft 48. A plurality of cross members 84, 85, 86 and 87 are associated with the bolts 82 and 83 and are provided with openings through which the shaft 48 projects. These cross members 84, 85, 86 and 87 are suitably spaced apart by sleeves or spacing members 88 of suitable lengths to definitely locate these members so as to separate the arms 75 and 76 from the adjacent torque-opposing devices 50, 51 and 52.

The arrangement of parts of the supporting structure and other elements associated with the opposite end of the shaft 48 is similar to that just described, except that only two torque-opposing devices 54 and 55 are provided. The control drum 16 is carried by the shaft 48, and the stationary contact terminals or fingers 35 to 42, inclusive, are suitably mounted upon a supporting member 89 for coöperative engagement therewith.

For purposes of protection, a plurality of inclosing casings 90 and 91 are provided and associated with the end of brackets 49.

Before describing the operation of the system, it is deemed advisable to set forth the operation of the torque device 17, independently of its relationship to the rest of the system.

Assuming that the apparatus occupies the position shown, with the several springs 63 properly adjusted for the desired tension, for instance, 3 lbs., and that the dynamo-electric machine 45, or any other type of torque apparatus, be caused to develop a torque tending to rotate the shaft 48 in a counter-clockwise direction, as viewed from the right-hand end thereof, the operation is as follows: The pin 80 of the arm 76 is at once brought into engagement with the finger 66 of the torque-opposing device 52, and further movement of shaft 48 is, therefore, prevented until the torque apparatus develops a torque in excess of the tension of the spring. Thereupon, the torque apparatus overcomes the action of the spring 63 and moves positively and comparatively rapidly until the pin 79 is brought into engagement with the finger 66 of the torque-opposing device 51. When this engagement is effected the device 51 becomes active and adds the tension of its associated spring 63 to that of the spring already in action. Thus, the combined action of the springs of the devices 51 and 52 imposes a restraint upon the torque apparatus of six pounds and prevents further movement until said apparatus develops a torque sufficient to overcome the opposing springs. Under these conditions, the torque apparatus and shaft 48 are at once moved through a definite angle until the spring 63 of the device 50 becomes active and prevents further rotative movement. In the same manner, the apparatus is permitted to move to its next position when the torque developed exceeds the opposing tension of nine pounds of the three springs 63 acting together.

Thus, the apparatus is caused to occupy a series of definite positions, and, moreover, to be moved from one position to the other with positiveness and quickness. By reason of the property of uniform tension of the springs 63, throughout a wide range, the positions of the torque apparatus and its associated control drum 16 are rendered definite, and a step-by-step movement thereof is effected. As the operation in the opposite direction is carried out in a similar manner, no description thereof is deemed necessary.

The operation of the system will now be set forth and particular reference may be had to Figs. 1, 2, 3 and 4. Assuming the torque device 17 and the controller drum 16 to occupy their neutral position marked "0," as shown in Fig. 2, a circuit is established from one side of the battery B, or other suitable source of energy, which includes stationary contact terminals 42 and movable conducting segment 34, where the circuit divides, one branch traversing contact terminal 38 and thence, through the energizing coils $d'$ and $j'$, in parallel, to the negative side of the battery B, while another branch includes contact terminal 37 and thence through energizing coil $c'$ to the battery and through interlock switch "$h''$ out" and energizing coil $i'$ to the battery. Upon the energization of the coils $d'$, $c'$, $i'$, and $j'$, their corresponding switches $c$, $d$, $i$ and $j$ are closed to connect the converter exciting winding 7 across the major portion of the transformer winding 4 and the converter secondary winding 8 to substantially the mid-point thereof. The preventive coils 22 and 23 serve their usual function to prevent a local short-circuit across the portions of the transformer winding 4 between the switches $c$ and $d$, and $i$ and $j$, said coils 22 and 23 being connected directly in parallel to these transformer sections.

Under these conditions, balanced three-phase voltages are delivered to the bus-bars or conductors 30, 31 and 32, provided, of course, that the converter 5 is designed to produce a voltage across its secondary winding 8 which is substantially 86.6% of the normal voltage of the transformer winding 4, in accordance with the well-known Scott or T connection. The voltage relations are shown in Fig. 4, $E_4$ representing the voltage of the transformer winding 4, $E_8$ the voltage of the converter winding 8, and X and Y the other phase voltages of the three-phase energy of the bus-bars 30, 31 and 32.

Suppose, now, that the switch 29 is closed to connect the dynamo-electric machine 12 to the bus-bars 30, 31 and 32 and that the starting resistance device 28 is operated to exclude resistance from secondary windings 14, whereby the motor 12 is brought up to speed; when the motor 12 is operated at light or no load, the voltage relations remain as described, but, when the motor 12 begins to take on its load, there is, by reason of the reactive drop in the converter 5, a tendency to distort the phase position thereof and to effect a reduction in the converter voltage $E_8$.

If the automatic torque device 17 were not employed, therefore, the point P would be moved to a position P', and unbalanced conditions would result. However, the torque device 17 is adapted to care for these distortions under load and to automatically compensate therefore in the following manner.

As the motor 12 gradually takes on its load, the current traversing the conductor 25 with which the series transformer 24 is associated, increases in amount, and, hence, a torque is developed in the torque device 17 that tends to rotate said device and its associated control drum 16 in a predetermined direction, which is assumed to be counter-clockwise when referring to Fig. 5. When the torque developed becomes sufficient to overcome the tension of the first spring 63 of the torque-opposing device 52, the drum 16 is moved into position marked "Acc. 1." Thus, a circuit is established from the conducting segment 34 of the control drum 16, through contact terminal 39 and thence, through a branch including the energizing coil $e'$, to the battery, and, through another branch including the interlock switch "$l''$ out" and energizing coil $k'$ to the battery. Thus, switches $e$ and $k$ are closed. Concurrently with this action, contact terminal 37 is disengaged from the conducting segment 34 and, hence, energizing coils $c'$ and $i'$ are open-circuited, and their corresponding switches $c$ and $i$ are opened. It is seen, therefore, that the connection of the converter secondary winding 8 is shifted to the right of the mid-point of the transformer winding 4, whereby the converter distortion is corrected, while the connection of the exciting winding 7 is also shifted to the right, thereby increasing the converter excitation and, consequently, restoring the converter voltage to its initial value. Thus, balanced load conditions are maintained, and corrections in the amount and phase position of the voltage are automatically effected.

When the load on the motor 12 increases further to an amount sufficient to cause the torque of the torque device 17 to overcome the combined effect of the springs 63 of the torque-opposing devices 52 and 51, the control drum 16 is positively moved into its next position marked "Acc. 2."

This action causes the control drum conducting segment 34 to be brought into engagement with the contact terminal 40 and thus to complete a circuit therefrom, one branch of which includes the energizing coil $f'$ and the other includes energizing coil $l'$, whereby the switches $f$ and $l$ are closed. During this action, contact terminal 38 disengages the conducting segment 34 and hence, deënergizes coils $d'$ and $j'$ and permits the opening of the corresponding switches $d$ and $j$.

It will be noted that the connections of the converter windings 7 and 8 to the transformer winding 4 have been shifted again to the right, whereby corrections for distortion and for reduction in excitation are effected.

In case of further increases in the motor load sufficient to overcome the combined action of the three springs 63 of the torque opposing devices 50, 51 and 52, the controller drum 16 is caused to move another notch marked "Acc. 3," and switch $g$ is closed and switch $e$ opened, while the switches $k$ and $l$ are maintained closed.

The action, therefore, is entirely automatic, and the converter connections to the transformer winding 4 are adjusted in response to load conditions to effect automatic compensations for the phase distortion and voltage reduction.

Under certain conditions of operation, particularly if the system is used in connection with an electric railway vehicle or with a flywheel, it is evident that, at times, the machine 12 will be driven as a generator by the inertia of the rotating parts, and will regenerate energy through the converter 5 in the reverse direction to the source 1—G. Inasmuch as the current through conductor 25 is thus reversed in direction, the effect upon the torque device 17 is to reverse its direction of operation and move it into one of its regeneration positions, marked "Reg. 1 and 2." Otherwise, it operates, in the manner herein set forth, to rotate the control drum 16 and to automatically effect the necessary compensations for phase distortion and voltage reduction in accordance with the regenerated load.

On account of the similarity of operation of the system, under conditions when the dynamo-electric machine 12 operates as a generator, to that hereinbefore described, it is believed that no difficulty will be experienced in understanding the action and, hence, no description thereof is deemed necessary. It will, of course, be understood that, during the regenerative period, the distortion of phase position is in the opposite direction to that already discussed in connection with the motor operation, and the voltage change is an increase instead of a decrease, the point P moving to P².

Although we have shown and described our invention as embodying a specific arrangement of parts and circuit connections, and in connection with a torque device of a specific type, it will be understood that our invention is broadly applicable to systems and apparatus differing widely from that which we have chosen for illustrative purposes, and we desire that only such limitations shall be imposed as are indicated in the appended claims.

We claim as our invention:

1. The combination with a single-phase source of energy, a polyphase dynamo-electric machine and phase-converting means connected between said source and said dynamo-electric machine, of auxiliary means responsive to load conditions for adjusting the connections of said converting means in accordance with the generator or the motor operation of said dynamo-electric machine.

2. The combination with a single-phase source of energy, a polyphase dynamo-electric machine and phase-converting means connected between said source and said dynamo-electric machine, of automatic means embodying a single actuating member for regulating the operation of said converting means in accordance with the generator or the motor operation of said dynamo-electric machine.

3. The combination with a single-phase source of energy, a polyphase dynamo-electric machine and phase-converting means connected between said source and said dynamo-electric machine, of a plurality of electrically controlled switches for effecting the connections between said converting means and said source, an auxiliary control apparatus for governing the operation of said switches, and a single electro-responsive device for actuating said control apparatus in accordance with the generator or the motor operation of said dynamo-electric machine.

4. The combination with a single-phase source of energy, a phase converter and a dynamo-electric machine adapted to act as a generator or as a motor, of automatic means for maintaining predetermined phase relations, irrespective of the nature of action of said dynamo-electric machine.

5. The combination with a single-phase source of energy, a phase converter and a dynamo-electric machine adapted to act as a generator or as a motor, of electro-responsive means for adjusting certain connections of said converter to one portion of said source when said machine is loaded as a motor and to another portion when said machine is loaded as a generator.

6. The combination with a single-phase transformer winding, a phase converter having adjustable connections to said winding and a dynamo-electric machine receiving energy from said converter, respectively of automatic means for adjusting the connections of said converter to one side of predetermined points in said winding when the dynamo-electric machine is operated as a motor and to the other side of said predetermined points when the machine is operated as a generator, said means being responsive to load conditions and adapted to maintain balanced conditions upon said phase converter.

7. The combination with a source of energy, a phase converter having one winding connected across said source and another winding connected to substantially the midpoint of said source, and a dynamo-electric machine adapted to receive energy from said phase converter, of automatic means embodying a single torque motor responsive to load conditions for shifting the connections of said phase converter with respect to said source to vary the excitation and the phase position of said phase converter during both generator and motor operation of said dynamo-electric machine.

8. The combination with a source of single-phase energy, a phase converter having a plurality of windings, a dynamo-electric machine adapted to act as a generator or a motor, and sets of switches for connecting one of said converter windings to substantially the mid-point of said source and for connecting the other winding across said source, of a switching device adapted to govern the operation of said sets of switches, and a torque device depending upon the nature and amount of load for adjusting said switching device.

9. The combination with a single-phase source of energy, a phase converter and a dynamo-electric machine adapted to act as a generator or as a motor, of a torque device having actuating coils respectively energized in phase with said source and in accordance with the current traversing a certain converter circuit, and switching means controlled by said torque device for varying the connections between said source and said converter in accordance with predetermined circuit conditions.

10. The combination with a single-phase source of energy, a phase converter having a primary winding energized in phase with said source and a secondary winding connected to an intermediate point of said source, and a dynamo-electric machine connected to said converter and adapted to act as a generator or as a motor, of a torque device having actuating coils respectively energized in phase with said source and in accordance with the current traversing said converter secondary winding, and switching means controlled by said torque device for varying the connections between said source and said converter to vary the excitation and correct the phase distortion of said converter under varying circuit conditions.

11. The combination with a single-phase transformer winding, a phase converter having a primary winding connected in circuit with said transformer winding and a secondary winding connected to an intermediate point of said source, and a dynamo-electric machine connected to said converter and adapted to act as a generator or as a motor, of a torque device having actuating coils respectively energized in phase with said transformer winding and in accordance with the current traversing said converter secondary winding, and switching means controlled by said torque device for adjusting certain connections of said converter to one portion of said transformer winding when said machine is loaded as a motor and to another portion when said machine is loaded as a generator.

12. The combination with a single-phase transformer winding, a phase converter having a primary winding connected in circuit with said transformer winding and a secondary winding connected to an intermediate point of said source, and a dynamo-electric machine connected to said converter and adapted to act as a generator or as a motor, of a torque device having actuating coils respectively energized in phase with said transformer winding and in accordance with the current traversing said converter secondary winding, a plurality of switches, severally having actuating coils, for effecting connections between said converter and said transformer winding, and contact members controlled by said torque device for selectively energizing the actuating coils corresponding to the switches on one side of each of two predetermined points in said transformer winding when the dynamo-electric machine is operated as a motor and selectively energizing the actuating coils corresponding to the switches on the other side of said predetermined points when the machine is operated as a generator.

In testimony whereof, we have hereunto subscribed our names this 23rd day of May, 1914.

KARL A. SIMMON.
ARTHUR J. HALL.

Witnesses:
H. T. MORRIS,
B. B. HINES.